(12) United States Patent
Thomas et al.

(10) Patent No.: US 11,586,741 B2
(45) Date of Patent: *Feb. 21, 2023

(54) DYNAMIC COMMUNICATION ARCHITECTURE FOR TESTING COMPUTER SECURITY APPLICATION FEATURES

(71) Applicant: Malwarebytes Inc., Santa Clara, CA (US)

(72) Inventors: Sunil Mathew Thomas, Palm Harbor, FL (US); Jonathan Chan, Round Rock, TX (US); Jonathan Eagan Rackley, Cleveland Heights, OH (US)

(73) Assignee: Malwarebytes Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/410,959

(22) Filed: Aug. 24, 2021

(65) Prior Publication Data
US 2022/0318397 A1 Oct. 6, 2022

Related U.S. Application Data

(63) Continuation of application No. 17/218,075, filed on Mar. 30, 2021, now Pat. No. 11,126,731.

(51) Int. Cl.
*G06F 21/57* (2013.01)
*G06F 11/36* (2006.01)
*G06F 21/54* (2013.01)

(52) U.S. Cl.
CPC ........ *G06F 21/577* (2013.01); *G06F 11/3688* (2013.01); *G06F 11/3692* (2013.01); *G06F 21/54* (2013.01)

(58) Field of Classification Search
None
See application file for complete search history.

(56) References Cited

U.S. PATENT DOCUMENTS

| 6,249,886 | B1 | 6/2001 | Kalkunte |
| 8,713,687 | B2 | 4/2014 | Sobel et al. |

(Continued)

FOREIGN PATENT DOCUMENTS

CN 110851838 A * 11/2019 ........... G96F 21/577

OTHER PUBLICATIONS

Kerivan, "Self-Defending Security Software", 2005, IEEE (Year: 2005).*

(Continued)

*Primary Examiner* — Hossain M Morshed
(74) *Attorney, Agent, or Firm* — Fenwick & West LLP

(57) ABSTRACT

A computer security system includes a test management system and associated communication architecture that enables creation of customized tests of computer security application features. A server stores a test script in a custom scripting language. The test script includes a set of control statements that may be organized in a decision tree to control facilitation of the test. Clients poll the server to independently obtain and execute the control statements. Execution of the control statements control which clients participate in a test, which feature will be tested in the test, and what telemetry data will be collected from the clients to evaluate the test. The server evaluates the telemetry data to determine an outcome of the test and determines whether to further distribute or roll back the tested feature based on the test outcome. The testing can be utilized to rapidly and robustly deploy features that will enhance computer security.

20 Claims, 4 Drawing Sheets

(56) References Cited

U.S. PATENT DOCUMENTS

| | | | |
|---|---|---|---|
| 9,632,903 | B2 | 4/2017 | Brown et al. |
| 9,935,984 | B1 | 4/2018 | Castilho et al. |
| 10,185,826 | B1 | 1/2019 | Thomas et al. |
| 10,282,550 | B1* | 5/2019 | Sheridan .................... G06F 8/65 |
| 11,126,731 | B1* | 9/2021 | Thomas .............. G06F 11/3692 |
| 2010/0154027 | A1* | 6/2010 | Sobel .................... G06F 21/552 |
| | | | 726/1 |
| 2018/0157843 | A1* | 6/2018 | McDuff ................ G06F 21/577 |
| 2021/0200665 | A1* | 7/2021 | Chikkala ................ G06N 5/027 |
| 2022/0237286 | A1* | 7/2022 | Lavado ................... G06F 21/54 |

OTHER PUBLICATIONS

Bezemer, C-P et al. "Automated Security Testing of Web Widget Interactions." ACM ESEC/FSE '09, Aug. 24-28, 2009, pp. 81-90.

* cited by examiner

DYNAMIC COMMUNICATION ARCHITECTURE FOR TESTING COMPUTER SECURITY APPLICATION FEATURES

CROSS-REFERENCE TO RELATED APPLICATIONS

This application is a continuation of U.S. patent application Ser. No. 17/218,075, entitled "Dynamic Communication Architecture for Testing Computer Security Application Features," filed on Mar. 30, 2021, which is incorporated by reference.

FIELD OF ART

The present disclosure generally relates to computer security applications, and more specifically to a communication architecture for facilitating testing of computer security application features.

BACKGROUND

Computer security applications must be highly adaptable to respond to frequently changing threats. For example, detection rules may be frequently updated as new malware is discovered. Furthermore, it may be desirable to frequently adapt behavior of security applications in response to varying networking conditions, operating system state, or user interactions. Additionally, it is beneficial to test user responses to changes in the user interface or user messages to determine if such changes affect the user's engagement and utilization of the computer security application in a manner that may impact computer security.

SUMMARY

A method facilitates testing of a feature of a computer security application. A server obtains a script comprising a set of control statements. Respective queries are received from a plurality of clients for the control statements and the control statements are provided to the clients in response to the respective queries. Each of the clients independently executes the control statements. Execution collectively causes the feature of the computer security application to be enabled on a subset of a plurality of clients that meet specified cohort criteria set forth in the control statements, and causes at least the subset of the plurality of clients to send telemetry data to the server as specified by the control statements. Here, the telemetry data indicative of an effect of enabling the feature on the subset of the client applications. In response to the execution of the control statements, the server receives the telemetry data from at least the subset of the plurality of clients. The server evaluates the telemetry data to determine a test outcome, and executes an action based on the test outcome.

In an embodiment, evaluating the telemetry data and executing the action includes determining whether to roll back the feature or more widely distribute the feature by causing the feature to be enabled on an additional set of clients outside the subset of clients.

In an embodiment, each of the control statements includes a condition to be evaluated by a client and an action to be performed by the client based on evaluation of the condition. The action can include obtaining a second control statement for execution by the client, enabling or disabling the feature of the computer security application at the client, or sending telemetry data associated with the client to the server.

In further embodiments, a non-transitory computer-readable storage medium stores instructions that when executed by a processor causes the processor to execute the above-described method. In yet further embodiments, a computer device includes a processor and a non-transitory computer-readable storage medium that stores instructions for executing the above-described method.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A computer security system includes a test management system and associated communication architecture that enables creation of customized tests of computer security application features. A server stores a test script in a custom scripting language. The test script includes a set of control statements that may be organized in a decision tree to control facilitation of the test. Clients poll the server to independently obtain and execute the control statements. Execution of the control statements control which clients participate in a test, which feature will be tested in the test, and what telemetry data will be collected from the clients to evaluate the test. The server evaluates the telemetry data to determine an outcome of the test and determines whether to further distribute or roll back the tested feature based on the test outcome. The testing can be utilized to rapidly and robustly deploy features that will enhance computer security.

Figure 1:
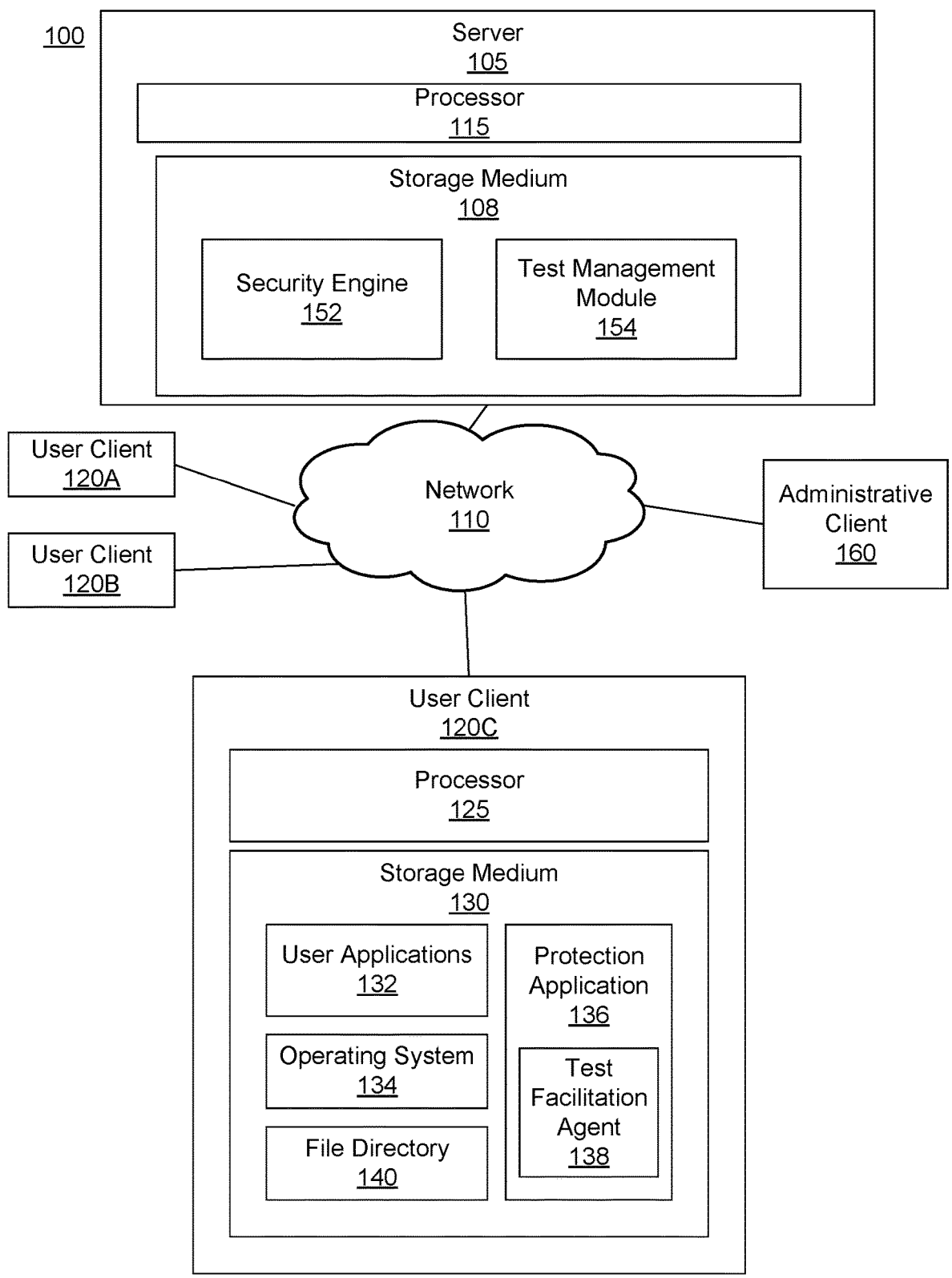
FIG. 1 is a system diagram illustrating an example embodiment of a computing environment for testing of security application features.

FIG. 1 is a system diagram illustrating an example embodiment of a system environment 100 comprising a server 105, a network 110, user clients 120A, 120B and 120C (which are collectively referenced herein as user clients 120), and an administrative client 160. For simplicity and clarity, only one server 105, one administrative client 160, and a limited number of user clients 120 are shown.

However, other embodiments may include different numbers of servers 105, administrative clients 160, and user clients 120. The system environment 100 may also include different or additional entities.

The network 110 represents the communication pathways between the server 105, the administrative client 160, and the user clients 120. In one embodiment, the network 110 includes the Internet. The network 110 may also include dedicated or private communications links that are not necessarily part of the Internet such as local area networks (LAN). In one embodiment, the network 110 uses standard communications technologies and/or protocols.

Each user client 120 comprises one or more computing devices capable of processing data as well as transmitting and receiving data via the network 110. For example, a client device 120 may be a desktop computer, a laptop computer, a smart phone, a tablet computing device, an Internet of Things (IoT) device, or any other device having computing and data communication capabilities. Each user client 120 includes a processor 125 for manipulating and processing data, and a storage medium 130 for storing data and program instructions associated with various applications. The storage medium 130 may include both volatile memory (e.g., random access memory) and non-volatile storage memory such as hard disks, flash memory, flash drives, external memory storage devices, USB drives, and the like. In addition to storing program instructions, the storage medium 130 stores various data associated with operation of the user client 120.

In one embodiment, the storage medium 130 comprises a non-transitory computer-readable storage medium that stores a file directory 140 and various executable programs including an operating system 134, a protection application 136, and user applications 132 that are each embodied as computer-executable instructions stored to the non-transitory computer-readable storage medium. The instructions, when executed by the processor 125, cause the user clients 120 to perform the functions attributed to the programs described herein.

The operating system 134 is a specialized program that manages computer hardware resources of the user clients 120 and provides common services to the user applications 132. For example, a computer's operating system 134 may manage the processor 125, storage medium 130, or other components not illustrated such as a graphics adapter, an audio adapter, network connections, disc drives, and USB slots. A cell phone's operating system 134 may manage the processor 125, storage medium 130, display screen, keypad, dialer, wireless network connections and the like. Because many programs and executing processes compete for the limited resources provided by the processor 125, the operating system 134 may manage the processor bandwidth and timing to each requesting process. Examples of operating systems 134 include WINDOWS, MAC OS, IOS, LINUX, UBUNTU, UNIX, and ANDROID.

The user applications 132 may include applications for performing a particular set of functions, tasks, or activities for the benefit of the user. Examples of user applications 132 may include a word processor, a spreadsheet application, an email client, and a web browser. In some cases, a user application 132 may be a source of malware that is unknowingly hidden in the user application 132. The malware may infect the user client 120 when the user application 132 is installed or executed. Additionally, malware may be inadvertently downloaded via a web browser, email client, or other source.

The file directory 140 stores files. Files may include system files associated with operation of the operating system 134, the user applications 132, or the protection application 136. The files may further include user files that may be created or modified by users. Examples of user files may include image files, video files, word processor documents, spreadsheet documents, and drawing files.

A protection application 136 provides various security features. For example, the protection application may include an anti-malware component that detects, stops, and removes malware. The protection application 136 may prevent new malware from being installed on a user client 120 or remove or disable existing malware that is already present on the user client 120. The protection application 136 may determine if a process is malware based on behaviors indicative of malware, based on static analysis of a file, based on emulation of a program using a sandbox, or based on a combination of factors. In one embodiment, the protection application 136 may store and/or download from the network 110, malware definitions that specify characteristics or behaviors of malware that the protection application 136 seeks to detect. In response to detecting malware, the protection application 136 may facilitate remediation of the malware. For example, the protection application 136 may enabling quarantining or removal of the malware. The protection application 136 may furthermore provide other security features besides malware detection such as a firewall, a virtual private network (VPN) client, data encryption tools, user authentication tools, and data recovery tools. These features may similarly be updated or controlled based on information received from the server 105.

The protection application 136 may include a user interface for enabling a user of the user client 120 to interact with the protection application 136. The user interface may enable the user to view various information relating to operation of the protection application 136 (e.g., detection events, scheduled scans, etc.), configure user settings associated with the protection application 136, view messages associated with use of the protection application 136 or other security best practices, or perform other interactions. User interface features may be changed at various intervals based on updates received from the server 105.

The protection application 136 includes a test facilitation agent 138 for facilitating participation of the user client 120 in tests orchestrated by the server 105. The tests may involve the test facilitation agent 138 enabling a feature of the protection application 136 and collecting telemetry data associated with usage, behavior, or performance of the client 120 responsive to the feature. This test data may be provided to the server 105 for evaluation as will be described in further detail below. In an embodiment, the protection application 136 may include an option to enable a user to opt in or opt out of participating in tests. If the user opts out of participation, the test facilitation agent 138 may be disabled and the protection application 136 does not share telemetry data with the server 120 associated with testing of features.

The server 105 is a computer system configured to store, receive, and transmit data to the user clients 120 via the network 110. The server 105 may include a singular computing system, such as a single computer, or a network of computing systems (e.g., a cloud server), such as a data center or a distributed computing system. In one embodiment, the server 105 includes a processor 115 for manipulating and processing data, and a storage medium 108 for storing data and program instructions associated with various applications. The storage medium 108 may include both volatile memory (e.g., random access memory) and non-volatile storage memory such as hard disks, flash memory, flash drives, external memory storage devices, USB drives, and the like. The server 105 may receive data from the user clients 120 and administrative client 160 and may also send data to the user clients 120 and administrative client 160.

The storage medium 108 comprises a security engine 152 and a test management module 154. The security engine 152 interacts with the protection application 136 to facilitate operation of the security features. For example, the security engine 152 may generate and distribute malware definitions utilized by the protection application 136 to detect and remediate malware. The security engine 152 may furthermore generate configurations for VPN clients, firewalls, or other security functions executed by protection application 136. In addition, the security engine 152 may control distribution of user messages relating to operation of the protection application 136 or general security practices, and may control distribution of updates to the user interface of the protection application 136.

The test management module 154 manages testing of security application features associated with the protection application 136. Examples of tests may include, for example, a test for determining whether a new malware definition results in a sufficiently low rate of false positives, a test to determine whether a configuration of a VPN or other security feature achieves a desired performance level, a test to determine whether a user message to users of the protection application 136 results in a certain compliance level or achieves a desired response pattern, a test to determine which variant of a user interface receives higher usage level, a test to determine whether an update to an executable file results in a low rate of fault conditions, and so on.

A typical test is performed using a cohort of user clients 120 representing a relatively small subset of the clients 120 accessible to the server 105. Here, the cohort may be intelligently identified based on differing characteristics of different user clients 120 such as, for example, their configuration states (e.g., operating system installed, user applications installed, hardware configuration, etc.), the geographic location and local time zone, their usage patterns, or other information. For example, for some tests, it is desirable to have a diverse cohort to test the effect of a feature on clients 120 having a variety of different characteristics. In other instances, it is desirable to constrain the cohort to clients 120 having a limited set of defined characteristics.

During a test, a particular feature is enabled on some or all of the clients 120 in the cohort for a predefined period of time. The feature can comprise a configuration change, an updated security mechanism, a user interface change, a user message such as a recommendation or a question soliciting a response, or other feature. The test management module 154 operates in conjunction with the test facilitation agents 138 of the user clients 120 in the cohort to enable or disable the feature and to collect telemetry data from the user clients 120 in the cohort before, during, and/or after the test. The telemetry data may indicate usage or behavior patterns, changes in configurations, performance data, security data, or other data relevant to determining an effect of the feature. For example, the telemetry data may be relevant to determining if a feature results in improved security, computing, or memory performance, if a feature results in a specific desired usage level, etc. Furthermore, telemetry data may be relevant to determining how users respond to a particular set of user messages. For example, the messages may include survey questions that are collected from the user as telemetry data. In other cases, messages may include recommendations for users and the telemetry data may indicate if and when the recommendations are carried out. Based on the telemetry data, the test management module 154 evaluates the test result and determines an action. For example, the test management module 154 may determine whether to roll back a tested feature or distribute the feature more widely outside the initial cohort. In other cases, the test management module 154 may determine an additional test to run depending on the test outcome.

In some cases, a test may involve enabling a single version of the feature on a select subset of clients 120. In other cases, a test may involve enabling multiple different variants of the feature on different subsets of clients 120 (e.g., an A/B test) to determine which variant is preferred according to predefined test criteria. In this case, the cohort may be divided into subsets of user clients 120, with each subset enabling a different variant of the features to be tested (e.g., different user message with varying recommendations or questions, different configuration changes, different versions of a user interface, etc.).

The test management module 154 facilitates custom creation of tests utilizing a specialized scripting domain specific language (DSL) that custom defines each test. For example, a DSL script may control which clients 120 will participate in a test of a particular feature, when the feature will be enabled and for how long, how the given feature will be implemented, what telemetry will be collected from the clients 120 participating in the test, and other factors associated with a custom test. The DSL script may be accessed by respective test facilitation agents 138 of different clients 120 to enable each client 120 to independently carry out applicable parts of the script relevant to the test. Different tests can easily be created, updated, and managed using the DSL script without necessarily requiring code enabling a specific test to be directly compiled into the protection application 136. Examples of a DSL script organization are described in further detail below with respect to FIGS. 2-3.

The administrative client 160 comprises a client device accessible by an administrator of the server 105. The administrative client 160 may provide an administrative user interface that enables an administrator to configure tests by generating DSL scripts and view test results.

Figure 2:
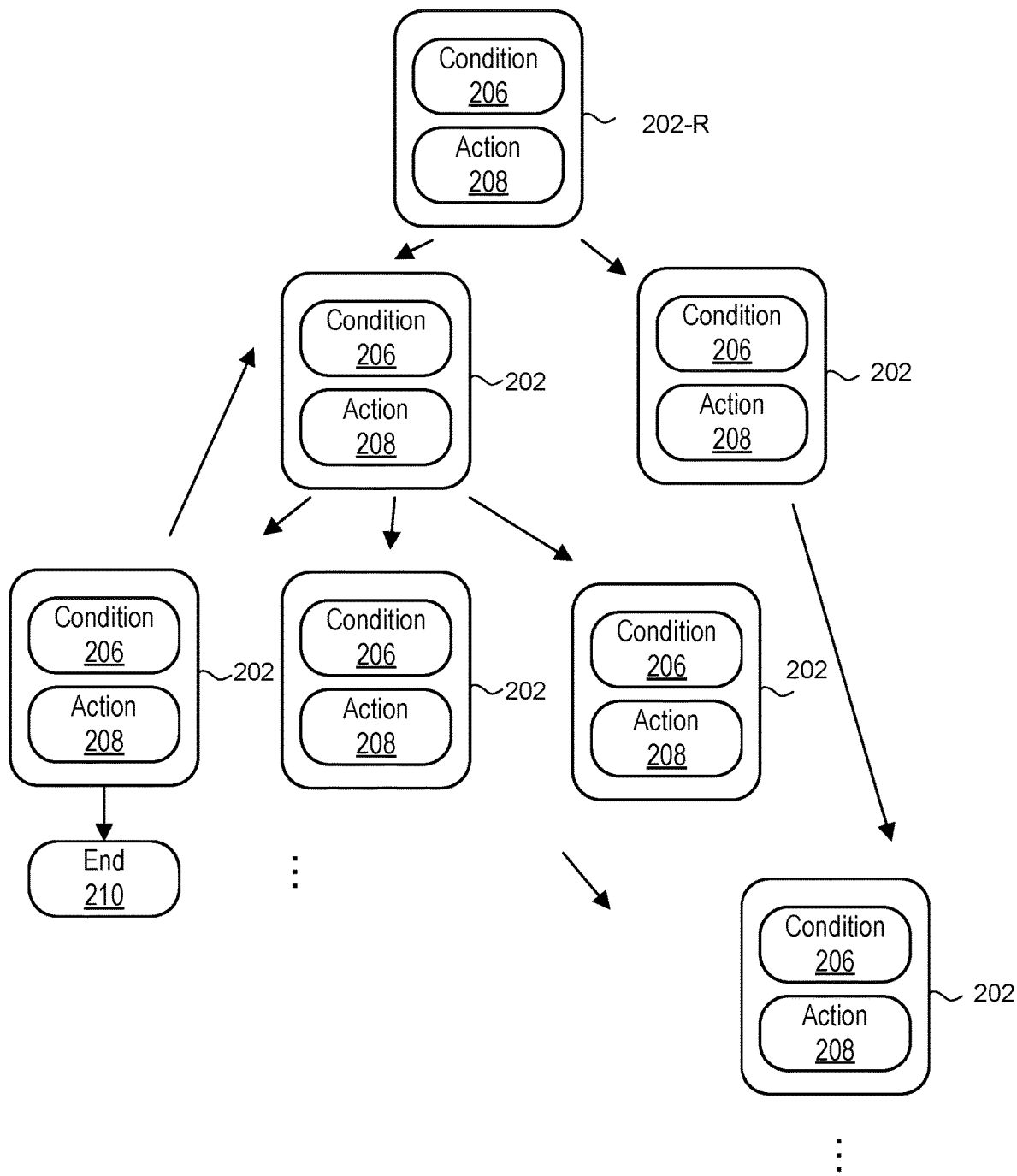
FIG. 2 is a diagram illustrating an example structure for a test script for enabling a test of a feature of the computer security application.

FIG. 2 illustrates an example structure of a DSL script for a particular test. In an embodiment, the DSL script includes a set of control statements 202 that each specify a condition 206 to be evaluated and one or more actions 208 to be executed by the client 120 dependent on the evaluation result of the condition 206. The action 208 can include directing the client 120 to execute a different specific control statement 202 in the script (as indicated by the arrows in FIG. 2). In this manner, control statements 202 can be linked together in decision trees, where each client 120 may traverse a different path through the tree depending on how it evaluates the conditions 206 in each control statement it encounters. Actions 208 may also specify an end point 210 that causes the script to be exited.

Actions 206 may also include executing a specific snippet of code on the client 120, generating a specific user message, or collecting and sending telemetry data to the test management module 154. The set of control statements 202 can include a root control statement 202-R that represents a starting point into the script for each client 120.

Control statements 202 can include client-side control statements and server-side control statements. In client-side control statements, the condition 206 is locally evaluated by the client 120. Here, the condition 206 may evaluate, for example, whether or not the client 120 has a particular configuration state, whether or not the client 120 falls within a specific geographic area or time zone, whether or not the client 120 has a particular usage or behavior pattern, or a combination of conditions. In server-side control statements, the condition is instead evaluated by the server 105 and may be based on information that is not necessarily locally accessible to the client 120. Here, the conditions may evaluate, for example, client-side analytical or profile data. To process a server-side control statement, the client 120 may send a request to the server 105 to process the control statement 202. The resulting actions may then be provided to the client 120.

Figure 3:
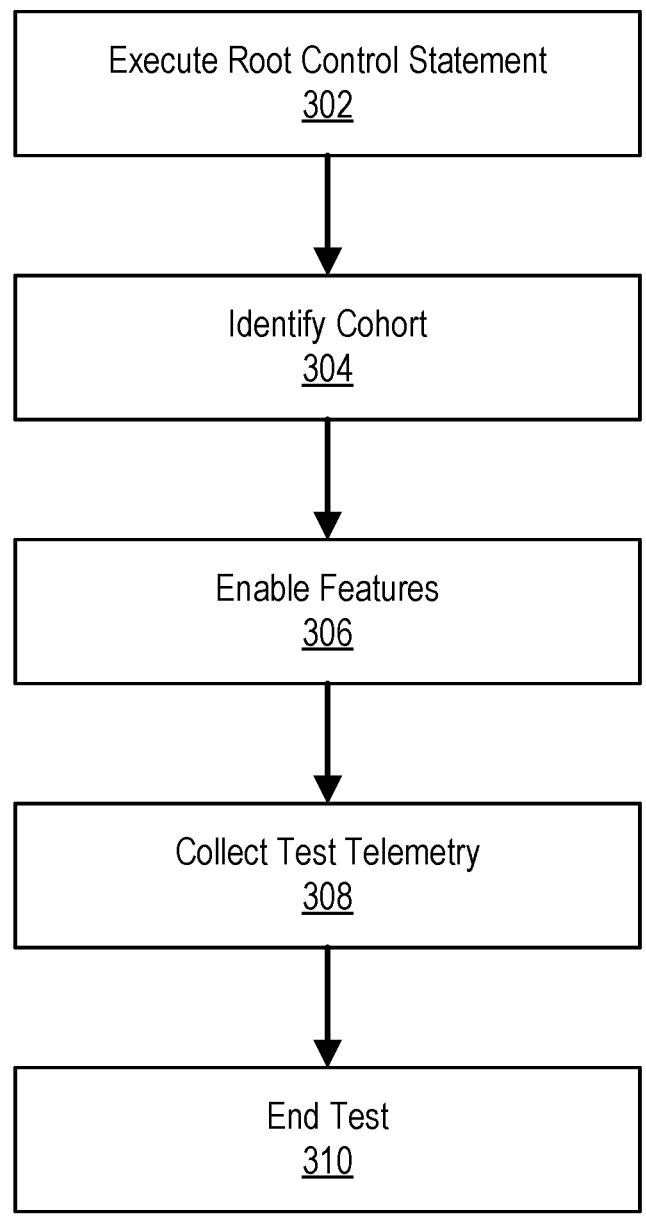
FIG. 3 is a flowchart illustrating an embodiment of a testing process enabled by a test script.

FIG. 3 illustrates an example process of a particular client 120 proceeding through an example DSL script associated with a test for a security application feature. The client 120 begins by executing 302 a root control statement that directs the client 120 to sequence of subsequent control statements (e.g., determined based on some evaluated condition associated with the client 120). The client 120 then executes one or more control statements that evaluate conditions to identify 304 whether or not the client 120 meets characteristics for the desired cohort. In this example, the client 120 meets the criteria and enables 306 the feature. The client 120 is next directed to one or more control statements that collect 308 various telemetry data from the client 120 relevant to evaluating an effect of the enabled feature. These control statements may be executed over some predefined time period to enable collection of telemetry data over the testing period. The script then ends 310.

The example of FIG. 3 represents just one possible path through a DSL script. As explained above, different clients 120 can take different paths through a decision tree for the same DSL script and thus not all clients 120 will proceed according to the same process. For example, some clients 120 may exit the process early if it is determined that they do not meet the characteristics associated with the initial cohort. Furthermore, more complex tests can be created than one the described. For example, in other cases, telemetry may be captured at various stages before the feature is enabled. Furthermore, after collecting telemetry with the feature enabled, the feature may be disabled and additional telemetry may be acquired for comparison. In yet further examples, multiple features may be enabled and disabled at different times and different types of telemetry data may be enabled or disabled at different times. Further still, a DSL script may enable the cohort to dynamically change responsive to telemetry data that is collected or in response to other conditions.

Figure 4:
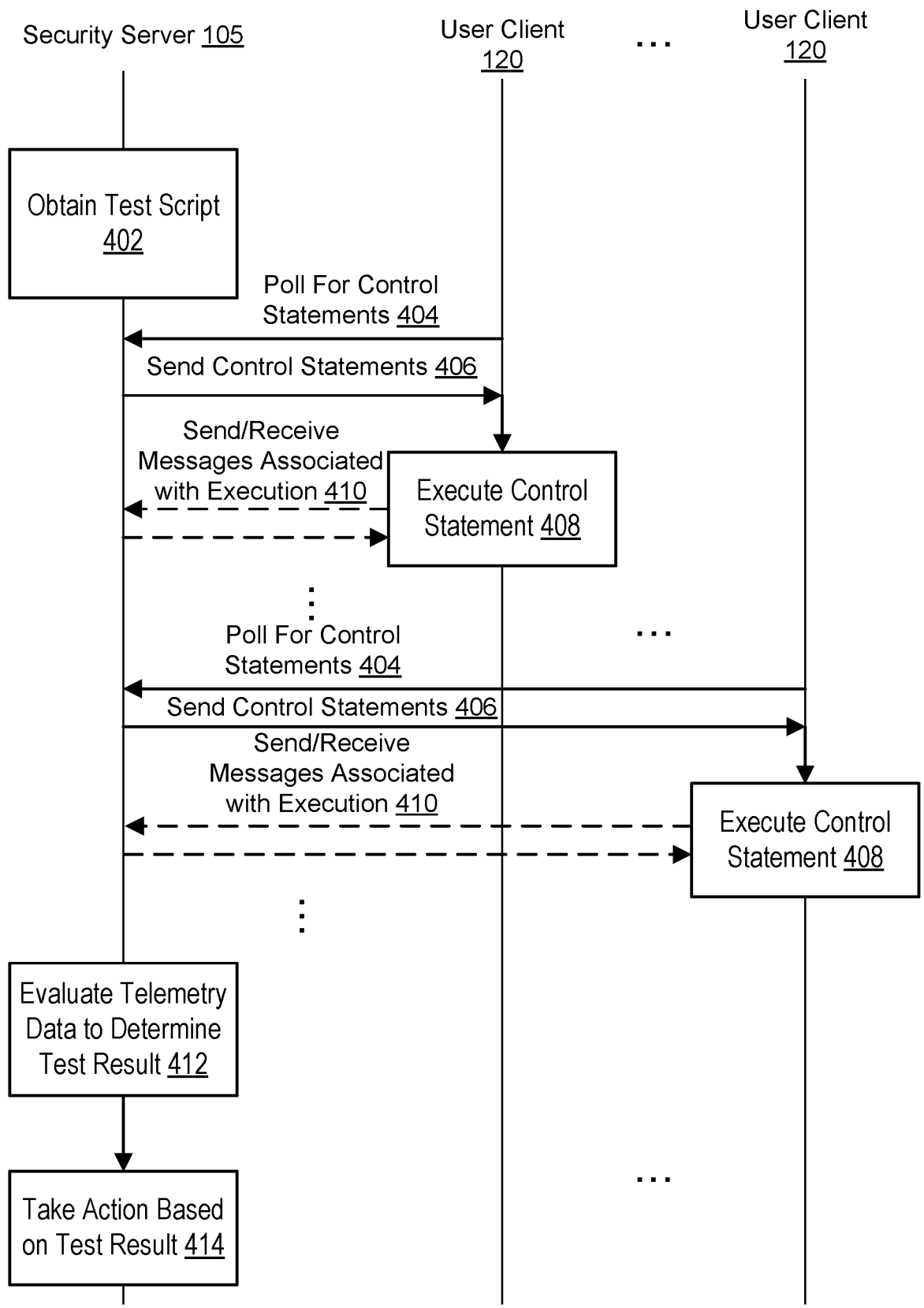
FIG. 4 is an interaction diagram illustrating a messaging protocol for enabling execution of a test script for testing features of a computer security application.

FIG. 4 is an interaction diagram illustrating how clients 120 interact with the server 105 to facilitate executing of a DSL script and evaluating a test of a security application feature. The server 105 obtains 402 a test script associated with a test. For example, the test script may be obtained via a test creation console on the admin client 160. The plurality of user clients 120 poll 404 the server 105 at various intervals for relevant control statements and the server sends 406 relevant control statements to the clients 120. For example, if a new script is obtained, each client 120 may be directed to the root control statement of the new script. Subsequently, the user clients 120 may poll the server for further control statements that the client is directed to by execution of a prior control statement. Upon obtaining a control statement, the user clients execute 408 the control statement. Execution of the control statement may involve communicating further with the server 105 by sending or receiving 410 messages associated with the execution. For example, if the control statement is a server-side control statement, the client 120 may query the server 105 for evaluation of the relevant condition specified by the controls statement and obtain the specified action. Otherwise, if the control statement is a client-side control statement, the client 120 evaluates the condition locally. Execution of the control statement may also involve the client requesting data from the server 120 to enable a specified feature (and receiving that data from the server), or may involve sending telemetry data to the server 105 as specified by the control statements. Each user client 120 proceeds with polling the server 105 to obtain further control statements and executing the control statements until they finish proceeding through their respective decision tree paths. Different clients 120 may proceed asynchronously through the test script 402 such that they do not necessarily all execute the same control statements concurrently. Once the server 105 has collected sufficient telemetry from the clients 120, the server evaluates 412 the telemetry data against predefined evaluation criteria to determine a test result associated with the specific test. For example, the test result may indicate whether or not a specified response rate was achieved, whether or not a specific performance level was met, which of a set of variants achieved a better result, etc. The server 105 then takes 414 an action based on the test result. Here, the action may include, for example, rolling out the feature to a wider set of clients 120 outside the initial cohort (e.g., in response to a positive outcome), or rolling back the feature (e.g., in response to a negative outcome).

In another example, the DSL scripts described above can be utilized to enable features on groups of clients 120 for purposes other than testing those features. For example, in one embodiment, the DSL scripts can be designed to detect clients 120 in malware prevalent regions of the world and either through automated or user-prompted mechanisms, turn on real-time protection or run a particular scan. If clients move from a malware prevalent region to a less targeted area, the scripts can be utilized to invoke full computer scans instead. In other embodiments, for malware that requires additional steps for removal such as removing keys from a website after an attack, the DSL scripts can be utilized to enable instructions to be sent to users on steps for removing the malware.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for facilitating testing of a feature of a computer security application, the method comprising:
   obtaining, at a server, a script comprising a set of control statements in a hierarchy, the hierarchy having a first path including a first subset of control statements and a second path including a second subset of control statement, wherein which path a client device traverses depends on evaluation of one or more conditions;
   receiving, from a plurality of clients, respective queries for the control statements;
   providing at least some of the control statements to the plurality of clients in response to the queries, wherein a first client of the plurality of clients follows the first path of the plurality of paths and a second client of the plurality of clients follows the second path of the plurality of paths;
   receiving telemetry data from the first and the second clients, wherein the first and the second clients send telemetry data to the server as specified respectively by the first and second subsets of control statements, the telemetry data indicative of an effect of enabling the feature on client applications associated with the first and the second clients, respectively;
   evaluating the telemetry data to determine a test outcome; and
   executing an action based on the test outcome.

2. The method of claim 1, wherein evaluating the telemetry data to determine a test outcome comprises:
   determining whether to roll back the feature or more widely distribute the feature; and
   responsive to determining to more widely distribute the feature, causing the feature to be enabled on an additional set of clients outside the subset of clients.

3. The method of claim 1, wherein each of the control statements includes a condition to be evaluated by a client and an action to be performed by the client based on evaluation of the condition, wherein the action for a first control statement comprises at least one of:
   obtaining a second control statement for execution by the client, enabling or disabling the feature of the computer security application at the client, and sending telemetry data associated with the client to the server.

4. The method of claim 3, wherein the control statements comprise a client-side control statement in which the condition is evaluated by the client based on locally-obtained data.

5. The method of claim 3, wherein the control statements comprise a server-side control statement in which the condition is evaluated on behalf of the client by the server.

6. The method of claim 1, wherein enabling the feature comprises at least one of:
   displaying a user message related to the computer security application; and
   executing a set of computer instructions related to operation of the computer security application.

7. The method of claim 1, wherein providing at least some of the control statements to the plurality of clients comprises:
   providing a root control statement to the first client, wherein the root statement represents a starting point into the script that directs the first client to a sequence of subsequent control statements in the first subset of control statements.

8. The method of claim 7, wherein providing at least some of the control statements to the plurality of clients further comprises, responsive to receiving a result of evaluating the root control statement from first client, providing the subsequent control statements in the first subset of control statements to the first client.

9. The method of claim 1, wherein providing at least some of the control statements to the plurality of clients further comprises:
   providing the set of control statements in the hierarchy to the first client, wherein the first path of the first set of control statements is identified from the set of control statements.

10. A non-transitory computer-readable storage medium storing instructions for facilitating testing of a feature of a computer security application, the instructions when executed by a processor causing the processor to perform steps including:
   obtaining, at a server, a script comprising a set of control statements in a hierarchy, the hierarchy having a first path including a first subset of control statements and a second path including a second subset of control statement, wherein which path a client device traverses depends on evaluation of one or more conditions;
   receiving, from a plurality of clients, respective queries for the control statements;
   providing at least some of the control statements to the plurality of clients in response to the queries, wherein a first client of the plurality of clients follows the first path of the plurality of paths and a second client of the plurality of clients follows the second path of the plurality of paths;
   receiving telemetry data from the first and the second clients, wherein the first and the second clients send telemetry data to the server as specified respectively by the first and second subsets of control statements, the telemetry data indicative of an effect of enabling the feature on client applications associated with the first and the second clients, respectively;

evaluating the telemetry data to determine a test outcome; and executing an action based on the test outcome.

11. The non-transitory computer-readable storage medium of claim 10, wherein evaluating the telemetry data to determine a test outcome comprises:

determining whether to roll back the feature or more widely distribute the feature; and responsive to determining to more widely distribute the feature, causing the feature to be enabled on an additional set of clients outside the subset of clients.

12. The non-transitory computer-readable storage medium of claim 10, wherein each of the control statements includes a condition to be evaluated by a client and an action to be performed by the client based on evaluation of the condition, wherein the action for a first control statement comprises at least one of:

obtaining a second control statement for execution by the client, enabling or disabling the feature of the computer security application at the client, and sending telemetry data associated with the client to the server.

13. The non-transitory computer-readable storage medium of claim 12, wherein the control statements comprise a client-side control statement in which the condition is evaluated by the client based on locally-obtained data.

14. The non-transitory computer-readable storage medium of claim 12, wherein the control statements comprise a server-side control statement in which the condition is evaluated on behalf of the client by the server.

15. The non-transitory computer-readable storage medium of claim 10, wherein enabling the feature comprises at least one of:

displaying a user message related to the computer security application; and executing a set of computer instructions related to operation of the computer security application.

16. The non-transitory computer-readable storage medium of claim 10, wherein providing at least some of the control statements to the plurality of clients comprises:

providing a root control statement to the first client, wherein the root statement represents a starting point into the script that directs the first client to a sequence of subsequent control statements in the first subset of control statements.

17. The non-transitory computer-readable storage medium of claim 16, wherein providing at least some of the control statements to the plurality of clients further comprises, responsive to receiving a result of evaluating the root control statement from first client, providing the subsequent control statements in the first subset of control statements to the first client.

18. A computer system comprising:

a processor; and a non-transitory computer-readable storage medium storing instructions for facilitating testing of a feature of a computer security application, the instructions when executed by the processor causing the processor to perform steps including:

obtaining, at a server, a script comprising a set of control statements in a hierarchy, the hierarchy having a first path including a first subset of control statements and a second path including a second subset of control statement, wherein which path a client device traverses depends on evaluation of one or more conditions;

receiving, from a plurality of clients, respective queries for the control statements;

providing at least some of the control statements to the plurality of clients in response to the queries, wherein a first client of the plurality of clients follows the first path of the plurality of paths and a second client of the plurality of clients follows the second path of the plurality of paths;

receiving telemetry data from the first and the second clients, wherein the first and the second clients send telemetry data to the server as specified respectively by the first and second subsets of control statements, the telemetry data indicative of an effect of enabling the feature on client applications associated with the first and the second clients, respectively;

evaluating the telemetry data to determine a test outcome; and executing an action based on the test outcome.

19. The non-transitory computer-readable storage medium of claim 10, wherein providing at least some of the control statements to the plurality of clients further comprises:

providing the set of control statements in the hierarchy to the first client, wherein the first path of the first set of control statements is identified from the set of control statements.

20. The computer system of claim 18, wherein providing at least some of the control statements to the plurality of clients further comprises:

providing a root control statement to the first client, wherein the root statement represents a starting point into the script that directs the first client to a sequence of subsequent control statements in the first subset of control statements; and responsive to receiving a result of evaluating the root control statement from first client, providing the subsequent control statements in the first subset of control statements to the first client.

\* \* \* \* \*